United States Patent
Graeff et al.

(10) Patent No.: US 8,370,751 B2
(45) Date of Patent: Feb. 5, 2013

(54) USER INTERFACE CUSTOMIZATION SYSTEM

(75) Inventors: Oliver Graeff, Wiesloch (DE); Peter Conrad, Leimen (DE); Uwe Reimitz, Wiesloch (DE); Florian Weigmann, Karlsruhe (DE)

(73) Assignee: SAP AG, Walldorf (DE)

( * ) Notice: Subject to any disclaimer, the term of this patent is extended or adjusted under 35 U.S.C. 154(b) by 949 days.

(21) Appl. No.: 11/849,132

(22) Filed: Aug. 31, 2007

(65) Prior Publication Data

US 2009/0063988 A1  Mar. 5, 2009

(51) Int. Cl.
*G06F 3/00* (2006.01)
(52) U.S. Cl. .............................. 715/744; 715/747
(58) Field of Classification Search ........... 715/744–747
See application file for complete search history.

(56) References Cited

U.S. PATENT DOCUMENTS

| | | | |
|---|---|---|---|
| 5,072,412 A | 12/1991 | Henderson | |
| 5,179,700 A | 1/1993 | Aihara | |
| 5,220,675 A | 6/1993 | Padawer | |
| 5,287,514 A | 2/1994 | Gram | |
| 5,627,979 A | 5/1997 | Chang | |
| 5,790,863 A | 8/1998 | Simonyi | |
| 6,018,627 A | 1/2000 | Iyengar | |
| 6,069,623 A | 5/2000 | Brooks | |
| 6,073,148 A * | 6/2000 | Rowe et al. .................. 715/205 |
| 6,188,399 B1 * | 2/2001 | Voas et al. .................. 715/723 |
| 6,407,761 B1 * | 6/2002 | Ching et al. .................. 715/835 |
| 6,658,423 B1 * | 12/2003 | Pugh et al. .................. 1/1 |
| 6,915,486 B2 * | 7/2005 | Li et al. .................. 715/765 |
| 6,920,607 B1 * | 7/2005 | Ali et al. .................. 715/206 |
| 6,941,521 B2 * | 9/2005 | Lin et al. .................. 715/762 |
| 6,993,074 B2 * | 1/2006 | Zhang et al. .................. 375/240.11 |
| 7,197,715 B1 * | 3/2007 | Valeria .................. 715/767 |
| 7,536,645 B2 * | 5/2009 | Ducharme .................. 715/744 |
| 7,554,544 B2 * | 6/2009 | MacLaurin .................. 345/440 |
| 2003/0048296 A1 * | 3/2003 | Cullen et al. .................. 345/744 |
| 2003/0090514 A1 * | 5/2003 | Cole et al. .................. 345/744 |
| 2003/0145305 A1 * | 7/2003 | Ruggier .................. 717/100 |
| 2006/0136829 A1 * | 6/2006 | Abbar et al. .................. 715/744 |
| 2006/0200767 A1 * | 9/2006 | Glaeske et al. .................. 715/700 |
| 2006/0236307 A1 * | 10/2006 | Debruin et al. .................. 717/117 |
| 2007/0208454 A1 * | 9/2007 | Forrester et al. .................. 700/216 |
| 2007/0282896 A1 * | 12/2007 | Wydroug et al. .................. 707/103 R |
| 2008/0092057 A1 * | 4/2008 | Monson et al. .................. 715/744 |
| 2008/0155613 A1 * | 6/2008 | Benya et al. .................. 725/89 |

* cited by examiner

*Primary Examiner* — Phenuel Salomon
(74) *Attorney, Agent, or Firm* — Brake Hughes Bellermann LLP (57) ABSTRACT

A system comprising an application data retriever configured to request application data; a mapping data handler configured to request a set of mapping data which is associated with at least a selected user interface (UI) view; a customizing data handler configured to request a set of customizing data associated with the selected UI view; a UI data aggregator configured to combine, at least, the mapping data and the customizing data into a UI view generation data set; and a UI generator configured to generate a UI view utilizing, at least in part, the UI generation data set from the UI data aggregator and the application data.

16 Claims, 6 Drawing Sheets

File  Edit  View  Favorites  Tools  Help http://localhost/test

No.
402
Client Name:          404
406
Transaction Type:     408

Current Phase:

Exp sales vol.        411

Chance of Success     413

415
Survey

1. Do you understand the requirements of the expected results?   ◯ Yes  ◯ No
2. Does your solution match the requirements?                    ◯ Yes  ◯ No
3. Does the project have a high priority for the customer?       ◯ Yes  ◯ No

File  Edit  View  Favorites  Tools  Help http://localhost/test

No.
452
Artist:              454
456
License Type:    Analog Only   ▼  458

Current Phase:

Exp sales vol.        461

463

465
Checklist

1. Do you understand the requirements of the expected results?   ◯ Yes  ◯ No
2. Does your solution match the requirements?                    ◯ Yes  ◯ No
3. Does the project have a high priority for the customer?       ◯ Yes  ◯ No

```xml
<?xml version="1.0"?>
<grid gridtype="16Column2Panel " rows="6 " cols="16 " width="100%">
<gridcell col="1" row="1" colspan="8">
 <header id="4400BFF65149520AE10000000A4241AF" textid="4400BFF65149520AE10000000A4241AF"/>
</gridcell>
<gridcell col="1" row="2" colspan="3">
 <label for="//BTOPPH/STRUCT.FORECAST_REL"/>
</gridcell>
<gridcell col="4" row="2" colspan="5">
 <checkbox id="//BTOPPH/STRUCT.FORECAST_REL"
           checked="//BTOPPH/STRUCT.FORECAST_REL" disabled=""/>
</gridcell>
<gridcell col="1" row="3" colspan="3">
 <label for="//BTOPPH/STRUCT.ASSISTANT_PHASE"/>
</gridcell>
<gridcell col="4" row="3" colspan="5">
 <inputfield id="//BTOPPH/STRUCT.ASSISTANT_PHASE"
             value="//BTOPPH/STRUCT.ASSISTANT_PHASE"
             mandatory="DL" disabled=""/>
</gridcell>
<gridcell col="1" row="4" colspan="3">
 <label for="//BTOPPH/STRUCT.BUDGET_BP"/>
</gridcell>
<gridcell col="4" row="4" colspan="5">
 <inputfield id="//BTOPPH/STRUCT.BUDGET_BP" value="//BTOPPH/STRUCT.BUDGET_BP"
             mandatory="" disabled=""/>
</gridcell>
<gridcell col="1" row="5" colspan="3">
 <label for="//BTOPPH/DB_CLIENTNAME_1" value="Artist" />
</gridcell>
<gridcell col="4" row="5" colspan="5">
 <inputfield id="//BTOPPH/DB_CLIENTNAME_1" value="David Bowie"
             mandatory="" disabled=""/>
</gridcell>
<gridcell col="1" row="6" colspan="3">
 <label for="//BTOPPH/STRUCT.CURR_PHASE"/>
</gridcell>
<gridcell col="4" row="6" colspan="5">
 <inputfield id="//BTOPPH/STRUCT.CURR_PHASE"
             value="//BTOPPH/STRUCT.CURR_PHASE" mandatory="" disabled=""/>
</gridcell>
</grid>
```

600

620

610

615

US 8,370,751 B2

USER INTERFACE CUSTOMIZATION SYSTEM

TECHNICAL FIELD

This description relates to customizing and managing a user interface, and more specifically, to the generation of a user interface by utilizing, at least in part, both mapping data and customizing data to modify a baseline user interface.

BACKGROUND

A graphical user interface typically allows a user to interact with a software program. Such interfaces generally include fields in which the user may enter data and fields in which data may be presented. In some instances fields may perform both tasks. For example, a field may include default data that the user may then edit. Such fields may include user interface elements, such as, text fields, combination (combo) boxes, buttons (radio, check, or generic buttons, etc.) and non-editable labels, etc.

Many software applications allow a user to customize the user interface in a limited way. Some software applications allow an end user to customize the user interface. For example, the end user may be able to change the color scheme, the font size, button placement, etc. of a user interface. In another example, an administrator may be responsible for customizing the user interface. The administrator may wish to control or dictate to an end user how a user interface will look and operate.

For example, a generic business application may be sold to a business. The business application may be tailored to a specific industry, but not to a specific business. The business may want to customize the user interface of the application to reflect their unique business needs and brands. In one illustrative example, the business may wish to have the application display their colors and logo. In a specific example, a coffee seller may wish to customize the user interface to display their unique terms for products (e.g. tall, grande, venti) as opposed to more generic terms (e.g. small, medium, large) supplied by the generic business application. Furthermore, the business's administrator may wish to remove user interface elements that are not pertinent to the way the business operates, or add user interface elements. This process may be very tedious and time consuming (and therefore costly) as typically each user interface screen or view must be customized individually.

SUMMARY

According to one general aspect, a system comprising an application data retriever configured to request application data; a mapping data handler configured to request a set of mapping data which is associated with at least a selected user interface (UI) view; a customizing data handler configured to request a set of customizing data associated with the selected UI view; a UI data aggregator configured to combine, at least, the mapping data and the customizing data into a UI view generation data set; and a UI generator configured to generate a UI view utilizing, at least in part, the UI generation data set from the UI data aggregator and the application data.

According to another general aspect, a method of generating a selected UI view comprising: retrieving mapping data which is associated with at least the selected UI view; retrieving customizing data which is associated with only the selected UI view; combining at least portions of the mapping data and the customizing data into a UI view generation data set; retrieving an application data; and generating the selected UI view utilizing the application data to populate the UI view generation data set.

The details of one or more implementations are set forth in the accompanying drawings and the description below. Other features will be apparent from the description and drawings, and from the claims.

BRIEF DESCRIPTION OF THE DRAWINGS

FIG. 6 is a diagram illustrating a set of mapping data for a system for customizing and managing a user interface.

DETAILED DESCRIPTION

Figure 1:
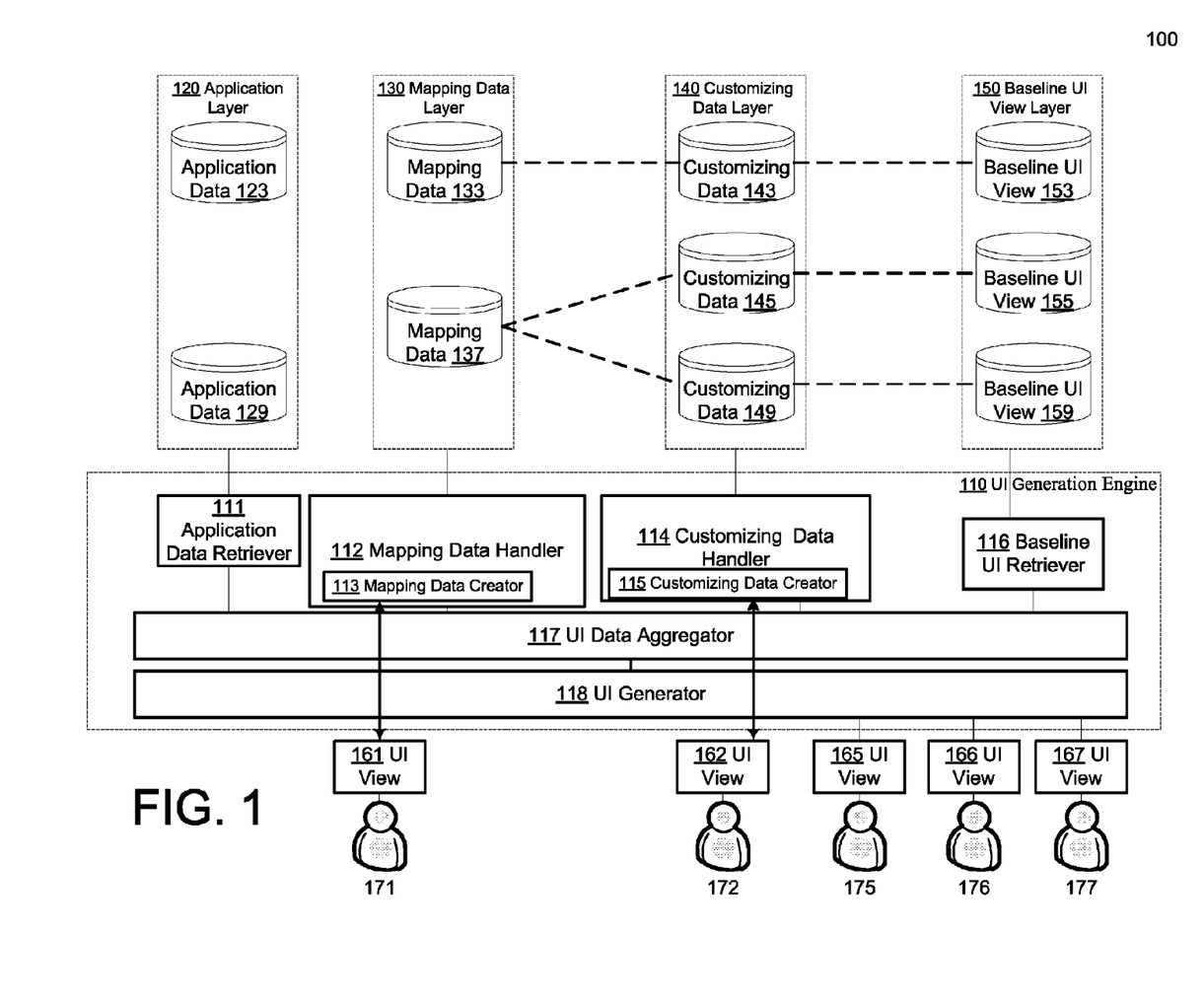
FIG. 1 is a block diagram illustrating an embodiment of a system for customizing and managing a user interface.

FIG. 1 is a block diagram of a system 100 for the generation of a user interface by utilizing, at least in part, both mapping data and customizing data to modify a baseline user interface. In typical user interface customization systems changes in the user interface (UI) may only be made per UI view or UI screen. In one embodiment, the system 100, or its elements, may allow changes in a plurality of UI views due to a customization command. A customization change may be made once and several UI views may be affected. In one embodiment, the UI customization may span several UI views that implement the same or similar business content.

In one embodiment, the system 100 may include a user interface generation engine 110, a plurality of UI views 161, 162, 165, 166, & 167, a baseline UI view layer 150, a customizing data layer 130, a mapping data layer 130, and an application data layer 120. In an illustrative embodiment, when a user selects a particular UI view to display, the user interface generation engine may retrieve pertinent data from the baseline UI layer, customizing data layer, and mapping data layer and aggregate the various UI view instructions found in those layers in order to create a UI view. The fields and elements in this UI view may then, in this embodiment, be populated with data from the application data layer. It is understood that this is merely one illustrative embodiment, that other embodiments are contemplated, and that the disclosed subject matter is not limited to this particular embodiment.

In one embodiment, the system 100 may include a user interface generation engine 110. The user interface generation engine 110 may include, in one embodiment, an application data retriever 111. The application data retriever 111 may be used, in one embodiment, to request or retrieve application data 123 & 129. It is noted that while FIG. 1 only illustrates two application data, any number of application data may exist. In one embodiment, the application data may be logically thought of as part of an application data layer 120. In specific embodiments, the application data may include, for example, customer relationship management data. In some embodiments, this data may include information such as, client information, sales order information, shipping information, product information, etc. In various embodiments, a UI View 161, 162, 165, 166, & 167 may be used and reused with multiple sets of application data. In other embodiments, the application data may be housed in a number of databases or even discrete systems.

In one embodiment, the user interface generation engine 110 may include, a mapping data handler 112 configured to request a set of mapping data 137 & 133 which is associated with at least a selected UI View. In one embodiment, the user interface generation engine may attempt to generate a particular or selected UI view; the mapping data handler may be capable of selecting mapping data that are associated with that selected UI view. In one illustrative embodiment, the user interface generation engine may be attempting to generate, for example, the "Customer Complaint" UI view. In this illustrative embodiment, the mapping data handler may search through the various mapping data and retrieve the mapping data associated with this UI view.

In one embodiment, the mapping data 133 & 137 may be logically thought of as part of a mapping data layer 130. It is noted that while FIG. 1 only illustrates two mapping data, any number of mapping data may exist. In one embodiment, the mapping data may include instructions utilized in generating particular UI views. The mapping data may allow an instruction or instructions to be associated with a number of UI views. For example, in one specific embodiment, a mapping data may include instructions which alters the generation of any UI view within a particular category of UI views, such as, all sales UI views or all accounting UI views. In another embodiment, the mapping data may specifically be associated with individual UI views, as opposed to a category of UI views. In yet another embodiment, the mapping data may simply be associated with all UI views that include a certain element. For example, all UI views that use a specific fieldname in the UI view may be associated with the mapping data.

In the embodiment, illustrated by FIG. 1, mapping data 137 is associated with the UI views derived from Baseline UI Views 155 & 159. Therefore, the instructions, and any changes to those instructions affect these two UI views. This illustrates the one-to-many relationship, in one embodiment, between the mapping data and the UI views. Also, in this illustrative embodiment, mapping data 133 is associated with the UI view derived from Baseline UI View 153. This illustrates that in some embodiments, the mapping data may not affect multiple UI views. As discussed above, other embodiments are contemplated and within the scope of the disclosed subject matter. In other embodiments, the mapping data to UI view relationships may be much more complex.

In one illustrative embodiment, the mapping data may include an association between a fieldname included in the application data and a UI element included in a plurality of UI views. For example, the application data may reference a fieldname, such as "DB_CLIENTNAME_1". The default or baseline version of the UI view may include a label associated with that fieldname that is rendered as "Client Name". The mapping data may include an instruction or association that indicates that instead of rendering the label as "Client Name" the label should be rendered as "Artist". In various embodiments, this association may affect a number of UI views. In alternate embodiments, the mapping data may be able to specify a subset of UI views that may be affected.

In one embodiment, the mapping data may include control elements or values for control elements that dictates or indicates how a user interface element of a UI view may be treated. In various embodiments, the control element may indicate that the UI element may be hidden, disabled, or mandatory. For example, a hidden UI element may not be seen in the UI view. In a specific illustrative embodiment, it may be desirable to hide a UI element, such as, a client discount rate, from the user. The mapping data may include an instruction or value instructing this information not be shown to the user.

In one embodiment, the mapping data may include more complex control information. In one embodiment, the mapping data may provide default values for various UI elements in the UI view. For example, a UI view that deals with a new sales project may have a UI element that states the percentage of work done on the project. The mapping data may, in one embodiment, indicate that the default value for this UI element is zero percent. In another embodiment, the mapping data may allow for more complex computations to be stored as a default value, as opposed to merely a set value. In such an embodiment, the computations may be represented in a scripting language, such as a language derived from or substantially based upon JavaScript. In yet another embodiment, the mapping data may allow for a set of permissible values to be associated with a UI element. In such an embodiment, the permissible values may be represented by a combination (combo) or pull-down box. In another such embodiment, the mapping data may allow a script or instructions that validate that data entered by the user via the UI view is within certain acceptable limits.

In one embodiment, the mapping data may allow for more complex customization of the UI view. In one embodiment, the mapping data may dictate the placement of the UI elements, or the creation of various control elements, such as buttons, checkboxes, etc. In one embodiment, the mapping data may allow for the customization of "Help" pages or various other large sections of substantially text-based information.

In one embodiment, the mapping data may be stored in a substantially text-based format. In one embodiment, this format may be a markup based language. In a specific embodiment, the language may be substantially complaint with or derived from Extensible Markup Language (XML), a general-purpose markup language. *Extensible Markup Language (XML)* 1.0 (4th Ed.), W3C Recommendation, 16 Aug. 2006. In another embodiment, the mapping data may be stored in a binary or more compressed format. In an embodiment, the mapping data may be stored within a database or variety of databases.

In one embodiment, the mapping data handler 112 may include a mapping data creator 113. In various embodiments, the mapping data creator may be configured to create or alter the contents of various mapping data. In one embodiment, a mapping layer UI view 161 may exist that allows a user 171 to customize a plurality of UI views by altering or creating various mapping data. In one embodiment, the mapping data creator may be configured to at least create in the mapping data an association between a fieldname included in the application data and a UI element included in at least one UI views. In one embodiment, the mapping data creator may be configured to at least set in the mapping data a value for a control element which dictates how a user interface element of a UI view is to be treated. In various embodiments, the mapping data creator may be able to edit or create some or all of the mapping data information described above.

In one embodiment, the user interface generation engine 110 may include a customizing data handler 114 configured to request a set of customizing data 143, 145 & 149 which is associated with the single selected UI View. In one embodiment, the user interface generation engine may attempt to generate a particular or selected UI view; the customizing data handler may be capable of selecting a customizing data that is associated with that selected UI view. In one illustrative embodiment, the user interface generation engine may be attempting to generate the "Customer Complaint" UI view, for example. In this illustrative embodiment, the customizing data handler may search through the various customizing data and retrieve the customizing data associated with this UI view. In one embodiment, as opposed to mapping data which allows for a one-to-many association with UI views the customizing data may allow for a one-to-one association with the UI view.

In one embodiment, the customizing data 143, 145 & 149 may be logically thought of as part of a customizing data layer 140. It is noted that while FIG. 1 only illustrates three customizing data, any number of customizing data may exist. In one embodiment, the customizing data may include instructions on how to alter the generation of particular UI views. The customizing data may allow an instruction or instructions to be associated with a particular UI view. In one embodiments, the customizing data may allow instructions some or all of the instructions described above in reference to mapping data. In another embodiment, the customizing data may control a different set or subset of instructions. In some embodiments, the customizing data may be stored in the same format or manner as the mapping data.

In the embodiment, illustrated by FIG. 1, customizing data 143 is associated with the UI view derived from Baseline UI View 153. Therefore, the customizing instructions, and any changes to those instructions, affect this UI view. Similarly, in this illustrative embodiment, customizing data 145 is associated with the UI view derived from Baseline UI View 155, and customizing data 149 is associated with the UI view derived from Baseline UI View 159. This illustrates the one-to-one relationship, in one embodiment, between the customizing data and the UI views. However, it is understood that this is merely one non-limiting illustrative embodiment of the disclosed subject matter.

In one embodiment, the customizing data handler 114 may include a customizing data creator 115. In various embodiments, the customizing data creator may be configured to create or alter the contents of various customizing data. In one embodiment, a customizing layer UI view 162 may exist that allows a user 172 to customize a single of UI view by altering or creating customizing data. In one embodiment, the customizing data creator may be configured to at least create in the customizing data an association between a fieldname included in the application data and a UI element included in one UI view. In one embodiment, the customizing data creator may be configured to at least set in the customizing data a value for a control element which dictates how a user interface element of a UI view is to be treated. In various embodiments, the customizing data creator may be able to edit or create some or all of the customizing data information described above.

In one embodiment, the mapping data and the mapping data creator 113 may be used to alter a number of UI views simultaneously or a substantially efficient manner. Conversely, the customizing data and the customizing data handler 115 may used to alter a single of UI view, possibly, in one embodiment, overriding the more general instructions provided by the mapping data.

In one embodiment, the user interface generation engine 110 may include a UI data aggregator 117 configured to combine, at least, the mapping data and the customizing data into a UI view generation data set (not shown). For example, in one embodiment, the UI data aggregator may receive mapping data and customizing data for a particular or selected UI view. The UI data aggregator may then merge the two data sets into a combined data set. In one embodiment, this combination may include a simple union of the two data sets. In another embodiment, portions of the data sets may be mutually exclusive or otherwise incompatible and a selection between the data sets may be desired. In one embodiment, the mapping data may be preferred. Conversely, in another embodiment, the customizing data may be preferred. In yet another embodiment, the preference may depend on the various control elements, the user that created the data, the most recent date the data was edited, or other techniques all of which are within the scope of the disclosed subject matter.

In one embodiment, the UI data aggregator 117 may receive a baseline UI view from a baseline UI retriever 116. In one embodiment, the baseline UI retriever may be configured to retrieve a baseline UI view 153, 155, or 159 that corresponds to the selected UI view. In the embodiment, the UI data aggregator may combine the baseline UI view with the mapping data. In one embodiment, various mapping data may have been retrieved as associated with the selected UI view. The UI data aggregator may then generate an intermediate UI view generation data set. In some embodiments, this intermediate UI view generation data set may be transitory or essentially ethereal. In one embodiment, the UI data aggregator 117 may combine the intermediate UI view generation data set with the customizing data to create a UI view generation data set. In various embodiments, the UI view generation data set may be transitory or essentially ethereal. It is understood that this is merely one illustrative example of how the data may be aggregated and that other techniques are contemplated and are within the scope of the disclosed subject matter.

As discussed above, in one embodiment, portions of the data sets may be mutually exclusive or otherwise incompatible and a selection between the data sets may be desired. In one embodiment, the mapping data, or portions thereof, may be used to determine how the customizing data is aggregated with the intermediate UI view generation data set t. For example, in one specific embodiment, the mapping data may indicate that a certain UI element is to be hidden, while the customizing data indicates that the UI element is to be set to a certain value. In one embodiment, the customizing data may be ignored. In another embodiment, the UI element may be set per the customizing data's instructions, but then ultimately hidden, per the mapping data's instructions. Conversely, in another embodiment, the customizing data may dictate that a UI element have a value that is expressly not permitted by the mapping data's instruction for the UI element. In one embodiment, the mapping data may prevail. In another embodiment, the customizing data may prevail. It is understood that various selection techniques are contemplated and are within the scope of the disclosed subject matter.

In one embodiment, the user interface generation engine 110 may include a UI generator 118 configured to generate a UI view utilizing, at least in part, the UI generation data set from the UI data aggregator 117 and the application data 123 or 129. FIG. 1 illustrates five UI Views 161, 162, 165, 166, & 167 being used by various users 171, 172, 175, 176, & 177. It is understood that the system and UI generator is not limited these number of UI views and that any number of UI views may be generated. It is also understood that these UI views may be generated, in one embodiment, simultaneous or substantially simultaneously.

In one embodiment, the UI generation data set may provide the UI generator with a shell of the UI view. The UI generator may then populate or fill the shell with information from the application data. In one embodiment, the application data may include a series of key/value pairs. The keys or fieldnames may be used by the UI generator to determine where and how the values are to be placed in the UI view. In one specific, non-limiting embodiment the application data may include a fieldname/value pair of "DB_CLIENTNAME_1" & "David Bowie". The UI generator may then display the UI view with the value "David Bowie" in a field associated with the value for the "DB_CLIENTNAME_1" fieldname. In other embodiments, the application data may include more complex information than key/value pairs. The UI generator may use various techniques to handle this information; these techniques are understood to be within scope of the disclosed subject matter.

In one embodiment, the UI generator may be configured to second or subsequent application data sets. These subsequent application data sets may then be used to repopulate the UI view, or an intermediate UI view. For example, a user may wish to move from a first application data record to a second. In a specific example, to which the disclosed subject matter is not limited, the second application data may include the fieldname/value pair of "DB_CLIENTNAME_1" & "Iggy Pop". The UI generator may then remove the value "David Bowie" in a UI field associated with the value for the "DB_CLIENTNAME_1" fieldname and display the value "Iggy Pop" instead. This may allow a user to move through a number of application data records. It is contemplated that other embodiments may exist that utilize different techniques to traverse a plurality of application data sets or records It is understood that these embodiments are within the scope of the disclosed subject matter.

In one embodiment, the data provided by the UI data aggregator 117 may not include any or all the information regarding the baseline UI view. The provided information, in this embodiment, may only be a combination of the available mapping and customizing data. In this embodiment, the UI generator may combine this UI view generation data set with a baseline UI view. In one embodiment, this baseline UI view may be hardcoded into the UI generator. In another embodiment, the baseline UI view may be a form of data retrieved from another source, such as, for example, via a baseline UI retriever 116. In a third embodiment, the portions of the baseline UI view may be hardcode while other portions may be derived form a data set. It is understood that other embodiments are contemplated and within the scope of the disclosed subject matter.

In one embodiment, the UI generator may be configured to generate a UI view that facilitates the creation of mapping data which influences, at least in part, the subsequent generation of a plurality of UI views, such as UI View 161. In one embodiment, the UI generator may be configured to generate a UI view that facilitates the creation of customizing data which influences, at least in part, the subsequent generation of a single of UI view, such as UI View 162. It is understood that while a UI view may generate or edit mapping data for other UI views, such as UI views 165, 166, & 167 that such an editing UI view may be influenced by its own associated mapping data and customizing data. Likewise, for UI views designed or capable of editing customizing data, such as UI view 162.

It is contemplated that the generation of such UI views may include merging multiple UI views into a single UI view. For example, in one embodiment the creation UI view may include a baseline UI view which is to be edited and then a secondary UI view which to be overlaid onto the baseline UI view. In a specific example, if user 171 desires to generate mapping data for UI view 166, the baseline UI view for 165 may be used and then a secondary editing interface or UI view (not shown) may be added to the baseline UI view to generate UI view 161. It is understood that this is merely one example of how a UI view may be generated and other techniques are within the scope of the disclosed subject matter.

Figure 2:
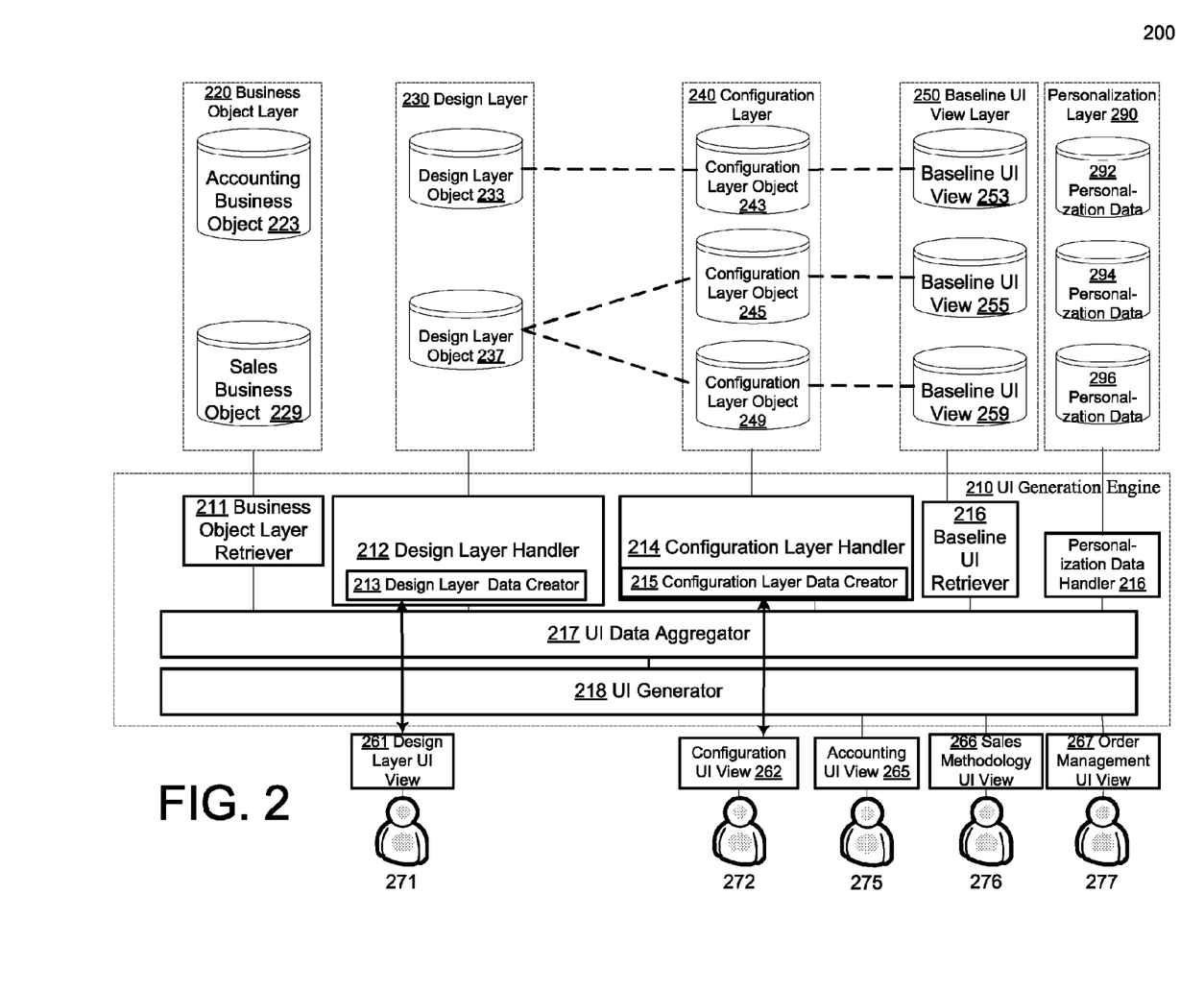
FIG. 2 is a block diagram illustrating a specific embodiment of a system for customizing and managing a user interface.

FIG. 2 is a block diagram illustrating a specific illustrative embodiment of a system for customizing and managing a user interface. FIG. 2 is roughly analogous to the system of FIG. 1 and described in detail above. It is understood that the system of FIG. 2 is merely one specific illustrative embodiment and the disclosed subject matter is not limited solely to FIG. 2.

In this embodiment, the application data layer may be referred to as a business object layer (BOL) 220. In one embodiment, the BOL may include various data objects, such as, accounting business object 223 and sales business object 229. Correspondingly, UI views relating to accounting UI view 265, sales methodology UI view 266, and order management view 267 may be used. It is understood that that these are merely a few illustrative examples and that other business data may be included in the BOL and other UI views may be generated. In one embodiment, the various business objects may include a plurality of data sets or records. In one embodiment, the application data may merely be a record of the business object and not the entire business object.

In one embodiment, the business object layer may be stored within a database or a plurality of databases. In one embodiment, the system 200 may include a business object layer retriever 211 analogous to the application data retriever discussed in reference to FIG. 1.

In one embodiment, the system 200 may include a design layer 230 analogous to the mapping data layer described above in reference to FIG. 1. In one embodiment the mapping data may be referred to as design layer objects 233 & 237. In one embodiment, the system 200 may include a design layer handler 212 and a design layer data creator 213, which may be analogous to the structures described above in reference to FIG. 1. Furthermore, in one embodiment, the system 200 may include a design layer UI view 261 which may be analogous to the UI view described above in reference to FIG. 1.

In one embodiment, the system 200 may include a configuration layer 240 analogous to the customizing data layer described above in reference to FIG. 1. In one embodiment the customizing data may be referred to as configuration layer objects 243, 245, & 249. In one embodiment, the system 200 may include a configuration layer handler 214 and a configuration layer data creator 215, which may be analogous to the structures described above in reference to FIG. 1. Furthermore, in one embodiment, the system 200 may include a configuration UI view 262 which may be analogous to the UI view described above in reference to FIG. 1.

In one embodiment, the system 200 may include a baseline UI view layer 250 having base line UI views 253, 255, & 259, a UI data aggregator 217 and a UI generator 218 analogous to the structures described above in reference to FIG. 1. These UI views may be used by users 271, 271, 275, 276, and 277.

In one embodiment, the system 200 may also include a personalization data layer 290 having personalization data 292, 294, and 296. Although only three personalization data sets are illustrated it is understood that any number of these may exist. In one embodiment, these personalization data may function similarly to the design layer or configuration data. However, these data may be associated with a particular user and not with a UI view. For example, user 277 may wish to see larger fonts in a UI view than is normal. In one embodiment, this personalization data may indicate this preference. In one embodiment, the personalization data may be associated with a single UI view, as with the configuration data. In another embodiment, the personalization data may be associated with a number of UI views, as with the design layer data. In yet another embodiment, the personalization data may apply to all UI views and be limited only to the user with whom it is associated. In one embodiment, the personalization may be associated with a group of users. In one embodiment, the system 200 may also include a personalization data handler 216 which may be configured to act, in various embodiments, similarly to the design layer handler and configuration layer handler described in detail above.

Figure 3:
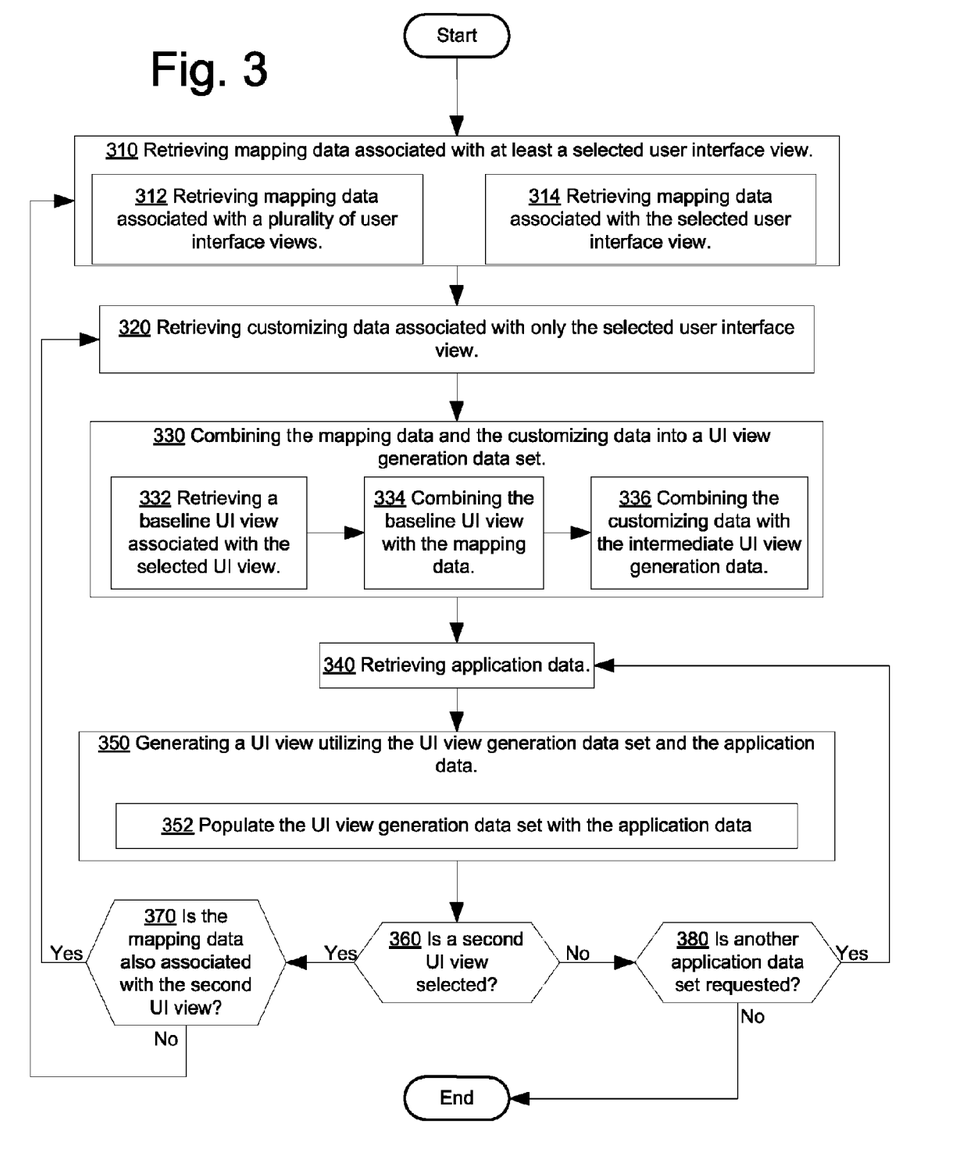
FIG. 3 is a flowchart illustrating example operations of the system of FIG. 1.

FIG. 3 is a flowchart illustrating example operations of the system of FIG. 1. Block 310 illustrates that, in one embodiment, mapping data associated with at least a selected UI view may be retrieved. In one embodiment, this retrieval may occur as described above in reference to FIG. 1, specifically the mapping data handler 112. Block 312 illustrates that, in one embodiment, the mapping data may be associated with a plurality of UI views. Conversely, block 314 illustrates that, in one embodiment, the mapping data may be associated with the selected UI view.

Block 320 illustrates that, in one embodiment, customizing data associated with the selected UI view may be retrieved. In one embodiment, customizing data handler 114 of FIG. 1 may perform this retrieval as described above.

Block 330 illustrates that, in one embodiment, the mapping data and the customizing data may be combined. In one embodiment, they may be combined into a UI view generation data set. In one embodiment, UI data aggregator 117 of FIG. 1 may perform this combination or aggregation as described above.

Block 332 illustrates that, in one embodiment, a baseline UI view associated with the selected UI view may be retrieved. Block 334 illustrates that, in one embodiment, this baseline UI view may be combined with the mapping data. Block 336 illustrates that, in one embodiment, this intermediate UI view data may be combined with the customizing data to create a UI view generation data set. In one embodiment, UI data aggregator 117 of FIG. 1 may perform this combination or aggregation as described above.

In one embodiment, combining the mapping data and the customizing data may include utilizing portions of the mapping data to determine how the customizing data is combined with the intermediate UI view generation data set to form the UI view generation data set. For example, portions of the customizing data may be ignored if the mapping data has rendered those portions irrelevant. Various embodiments and techniques are within the scope of the disclosed subject matter, some of which are described in detail above in regards to FIG. 1. In one embodiment, UI data aggregator 117 of FIG. 1 may perform this combination or aggregation as described above.

In one embodiment, combining the mapping data and the customizing data may include utilizing at least one control element which dictates how the user interface element of a UI view is to be treated. For example, in some embodiments, the control element may include a control element that controls whether a user interface element is hidden, a control element that controls whether a user interface element is disabled, or a control element that controls whether a user interface element is mandatory, etc. Various embodiments and techniques are within the scope of the disclosed subject matter, some of which are described in detail above in regards to FIG. 1. In one embodiment, UI data aggregator 117 of FIG. 1 may perform this combination or aggregation as described above.

Block 340 illustrates that, in one embodiment, application data may be retrieved. In one embodiment, the application data retriever 111 of FIG. 1 may perform this retrieval as described above.

Block 350 illustrates that, in one embodiment, the application data may be utilized to create the UI view. In one embodiment, the application data may be combined with a UI view generation data set. As illustrated by Block 352, in one embodiment, this combination may include populating the UI view generation with the application data. In one embodiment, the UI generator 118 of FIG. 1 may perform this generation as described above.

Block 360 illustrates that, in one embodiment, a second UI view may be selected. In one embodiment this selection may be due to a user request. Block 370 illustrates that, in one embodiment, if a new UI view is selected, a determination may be made as to whether or not the already retrieved mapping data is also associated with the second UI view. In various embodiments, the UI data aggregator 117 or the mapping data handler 112 of FIG. 1 may perform this determination and/or retrieval as described above. If so, in one embodiment, only new customizing data associated with the second UI view may be retrieved. In various embodiments, the UI data aggregator 117 or the customizing data handler 114 of FIG. 1 may perform this determination and/or retrieval as described above. If not, in one embodiment, both new mapping and customizing data associated with the second UI view may be retrieved. In one embodiment, if the mapping data is both associated with the second UI view but not all of the associated mapping data, a portion of the old mapping data may be retained and a new mapping data acquired. In various embodiments, the portions of the UI Generation Engine 110 of FIG. 1 may perform these actions as described above. Block 380 illustrates that, in one embodiment, if the selected UI view is retained new application data may be requested. In various embodiments, the UI data aggregator 117 or the application data handler 111 of FIG. 1 may perform this determination and/or retrieval as described above. For example, a user may with to change from reviewing a first customer's data to reviewing a second customer's data. FIG. 2 illustrates that, in one embodiment, the second application data may be retrieved and used to populate the intermediate UI view generation data. It is understood that other techniques for updating the UI views are contemplated and are within the scope of the disclosed subject matter and that this is merely one illustrative non-limiting example.

Figure 4A:
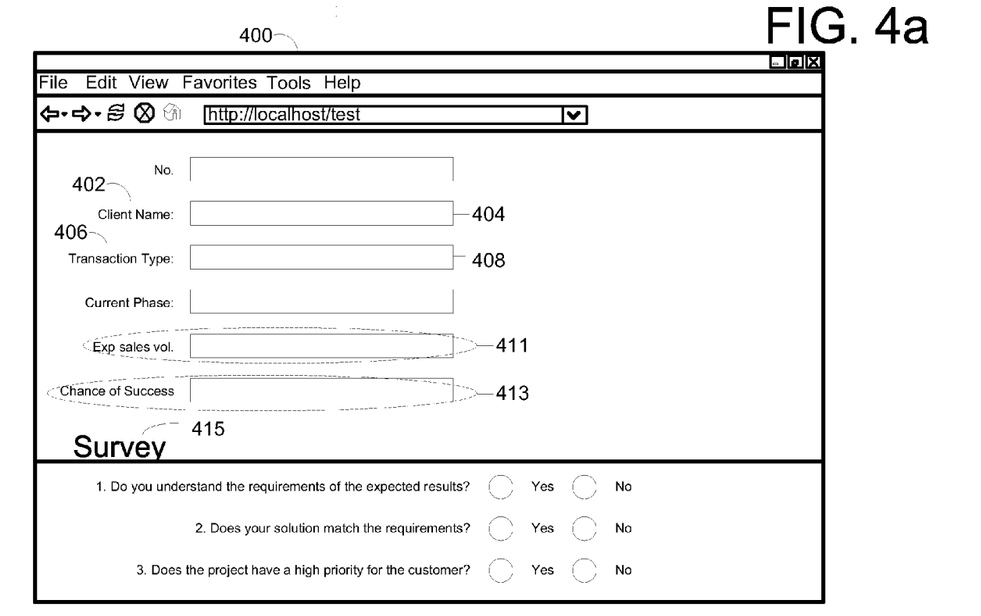
FIG. 4 is a diagram of illustrating an embodiment of user interface views for a system for customizing and managing a user interface.
Figure 4B:
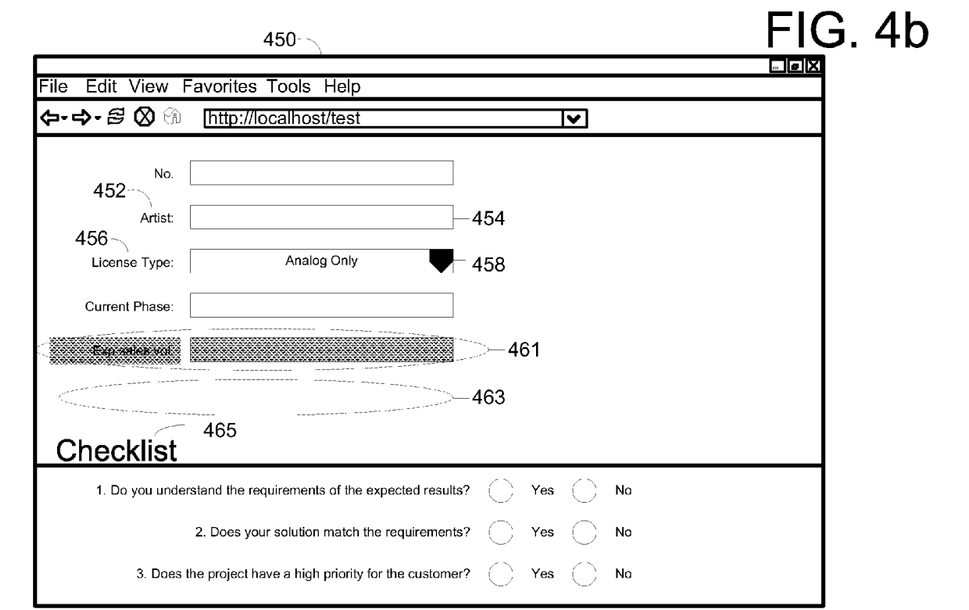

FIG. 4 is a diagram of illustrating an embodiment of a user interface view for a system for customizing and managing a user interface. In one embodiment, the baseline UI view 400 may include a number of UI elements. For example, in one illustrative embodiment, the UI view may include a label 402, a text field 404, a label 406, a data entry field 408, a UI element group 411, a UI element group 413, and a label 415.

In one embodiment, the baseline UI view may be generated and rendered as is. No mapping data or customizing data associated with the UI view may exist and therefore, the UI view may be generated in its default form. In another embodiment, mapping data and/or customizing data may be used to alter the generation of the UI view.

In one embodiment, the altered UI view may be represented by UI view 450. In UI view 450 some UI elements may remain unchanged from UI view 400. However, in this embodiment, the label 402 "Client Name" has been changed to label 452 "Artist". The instructions for such a change may be found, in this embodiment, in mapping data associated with this UI view among others. The association may be made as described in detail above in reference to FIG. 1.

Likewise, label 406 "Transaction Type" may be mapped to label 456 "License Type". Furthermore, in one embodiment, the data entry field 408 may be mapped via mapping data to the combination box 458. The mapping data may specify an inclusive set of values which may be acceptable within the UI view. In one embodiment, the mapping data may also specify a default value for the UI element, such as "Analog Only".

In one embodiment, the UI element group 411 may be controlled by the mapping data. The mapping data may include a control element that specifies that the UI element group is to be disabled. As a result, in this embodiment, the UI element group 461 is disabled or grayed out. In one embodiment, the UI element group 413 may be controlled by the mapping data. The mapping data may include a control element that specifies that the UI element group is to be hidden. As a result, in this embodiment, the UI element group 463 is not rendered in UI view 450. Finally, the label 415 "Survey" may be replaced with the label 465, "Checklist". In one embodiment, the mapping data may allow the UI element to be replaced with a graphic or other multimedia document. It is understood that the preceding discussion of FIG. 4 is merely one illustrative embodiment of the disclosed subject matter, and other embodiments are contemplated. It is also understood that some or all of the UI changes illustrated in FIG. 4. may occur due to mapping data or customizing data as discussed above. It is also understood that while only one UI view is illustrated, the mapping data information may affect a plurality of UI views.

Figure 5:
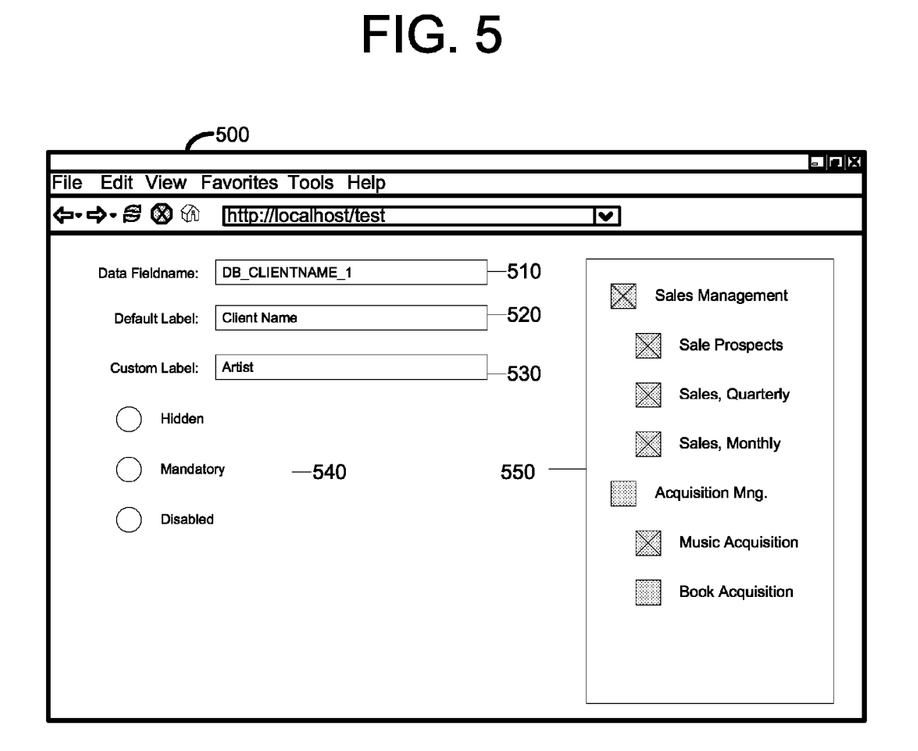
FIG. 5 is a diagram illustrating an embodiment of a user interface view that facilities the customizing and managing another user interface view.

FIG. 5 is a diagram of illustrating an embodiment of a user interface view 500 that facilities the customizing and managing another user interface view. In one embodiment, the UI view may facilitate the creation or editing of mapping data as discussed above in reference to FIG. 1, specifically UI view 161. In one embodiment, the UI view may include a field 510 which shows the fieldname associated with a particular UI element. In one embodiment, this fieldname may be part of a key/value pair in the application data, as discussed above; however, other embodiments are contemplated. This fieldname may be associated with a default UI element of a baseline UI view. In this embodiment, the fieldname is associated with the label "Client Name", and this association is presented to the user in field 520. A field 530 may allow the user to alter the value of the default UI element. In this embodiment, the default label may be changed from "Client Name" to "Artist". In addition, other alterations may be made to the baseline UI view. The radio buttons 540 allow for control elements regarding the fieldname and the UI element to be edited. Also, checkboxes 550 may allow a user to select a plurality of UI views to which the changes may be applied. It is understood that this is merely one illustrative embodiment of the disclosed subject matter and that other embodiments are contemplated. It is also understood that while FIGS. 4 & 5 show a web based user interface other user interfaces, such as, but not limited to, stand-alone applications or mobile applications, are within the scope of the disclosed subject matter.

FIG. 6 is a diagram of illustrating a set of mapping data for a system for customizing and managing a user interface. As described above, in one embodiment, the mapping data 600 may be stored in a substantially Extensible Markup Language (XML), a general-purpose markup language or a format similar to or derived from such a format. In other embodiments, other storage formats may be used. It is also understood that this is merely an illustrative embodiment of a possible mapping data storage format and not necessarily a fully functional representation.

This is merely one embodiment that attempts to illustrate some of the features of the mapping data discussed in detail above, and is not limiting on the disclosed subject matter. In one embodiment, the association 610 may link a fieldname "//BTOPPH/DB_CLIENTNAME_1" with a value "Artist". In one embodiment, the association 615 may set a default value for an input field associated with a fieldname. In this specific embodiment, the default value for the input field may be "David Bowie". In one embodiment, the mapping data may allow for a number of control elements 620 which indicate how a user interface element of a UI view may be treated. In the illustrated embodiment, the input field description may indicate that the field is to be considered mandatory. In this embodiment, the indication may be made by placing "DL" as the value for the mandatory key. The term "DL" may, in one embodiment, indicate that the value was set in the design layer (as shown in FIG. 2). In this embodiment, the disabled control element is left blank, indicating that the UI is not disabled. It is understood that other embodiments and indicators may be used.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    a processor coupled with a memory, and configured to execute computer readable instructions;
    an application data retriever configured to request application data;
    a mapping data handler configured to request a set of mapping data which is associated with a plurality of user interface (UI) views including a selected UI view;
    a customizing data handler configured to request a set of customizing data associated with only the selected UI view;
    a baseline UI retriever configured to retrieve a baseline UI view of the selected UI view that includes a UI view upon which to display at least a portion of the application data, wherein the UI view is configured to be altered by the mapping data and the customizing data, wherein the customizing data overrides one or more conflicting instructions of the mapping data for the selected UI view;
    a UI data aggregator configured to combine, at least, the mapping data and the customizing data into a UI view generation data set; and
    a UI generator configured to generate a UI view utilizing, at least in part, the UI generation data set from the UI data aggregator and the application data;
    wherein the UI data aggregator is configured to:
        combine the baseline UI view associated with the selected UI view and the mapping data into an intermediate UI view generation data set; and
        combine the intermediate UI view with the customizing data into the UI view generation data set; and
    wherein the UI data aggregator is configured to utilize portions of the mapping data to determine how the customizing data is combined with the intermediate UI view generation data set to form the UI view generation data set.

2. The system of claim 1 wherein the mapping data handler includes a mapping data creator configured to at least create in the mapping data an association between a fieldname included in the application data and a UI element included in a plurality of UI views.

3. The system of claim 2 wherein the mapping data creator is further configured to set, in the mapping data, a value for one of the control elements which indicates how a user interface element of a UI view is to be treated.

4. The system of claim 3 wherein the control element which indicates how the user interface element of a UI view is to be treated, is selected from a group of control elements consisting of:
    a control element that controls whether a user interface element is hidden;
    a control element that controls whether a user interface element is disabled; and
    a control element that controls whether a user interface element is mandatory.

5. The system of claim 1, wherein the mapping data handler is further configured to handle mapping data stored in a markup language format.

6. The system of claim 1, wherein the customizing data handler includes a customizing data creator configured to create an association in the customizing data between a fieldname included in the application data and a UI element included in a single UI view.

7. The system of claim 1 wherein the UI data aggregator is configured to, if the mapping data indicates that a UI element of the UI view is to be hidden, ignore the customizing data regarding the UI element.

8. The system of claim 1, wherein the UI generator is configured to:
    request a second application data; and
    repopulate the UI view with the second application data.

9. The system of claim 1, wherein the UI generator is configured to generate a UI view that facilitates the creation of mapping data which influences, at least in part, the subsequent generation of a plurality of UI views.

10. The system of claim 1, wherein the application data retriever is configured to request customer relations management data.

11. A method of generating a selected user interface (UI) view comprising:
    retrieving a baseline UI view of the selected UI view that includes a UI view upon which to display at least a portion of the application data;
    retrieving mapping data which is associated with a plurality of UI views including the selected UI view;
    retrieving customizing data which is associated with only the selected UI view, wherein the mapping data overrides one or more conflicting instructions of the customizing data for the selected UI view;
    combining at least portions of the baseline UI view, the mapping data and the customizing data into a UI view generation data set;
    retrieving an application data;
    generating the selected UI view utilizing the application data to populate the UI view generation data set;
    wherein combining includes:
        combining the mapping data with the baseline UI view to create an intermediate UI view generation data set; and
        combining the customizing data with the intermediate UI view data set to create the UI view generation data set; and
    wherein combining the customizing data includes utilizing portions of the mapping data to determine how the customizing data is combined with the intermediate UI view generation data set to form the UI view generation data set.

12. The method of claim 11 wherein utilizing portions of the mapping data includes utilizing at least one of the control elements which dictates how the user interface element of a UI view is to be treated, and
wherein the utilized control element is selected from a group of control elements consisting of:
a control element that controls whether a user interface element is hidden;
a control element that controls whether a user interface element is disabled; and
a control element that controls whether a user interface element is mandatory.

13. The method of claim 11 further including:
retrieving a second application data; and
repopulating the UI view with the second application data.

14. The method of claim 11, wherein retrieving the application data includes retrieving customer relations management data.

15. A non-transitory machine readable medium comprising instructions capable of being executed by at least one machine, wherein when executed cause the machine to generate a selected user interface (UI) view by:
retrieving a baseline UI view of the selected UI view that includes a UI view upon which to display at least a portion of the application data;
retrieving mapping data which is associated with a plurality of UI views including the selected UI view;
retrieving customizing data which is associated with only the selected UI view, wherein the mapping data overrides one or more conflicting instructions of the customizing data for the selected UI view;
combining at least portions of the baseline UI view, the mapping data and the customizing data into a UI view generation data set;
retrieving an application data;
generating the selected UI view utilizing the application data to populate the UI view generation data set;
wherein combining includes:
combining the mapping data with the baseline UI view to create an intermediate UI view generation data set; and
combining the customizing data with the intermediate UI view data set to create the UI view generation data set; and
wherein combining the customizing data includes utilizing portions of the mapping data to determine how the customizing data is combined with the intermediate UI view generation data set to form the UI view generation data set.

16. A non-transitory machine readable medium comprising instructions capable of being executed by at least one machine, wherein when executed cause the machine to attempt to generate a selected user interface (UI) view by:
retrieving a baseline UI view of the selected UI view that includes a UI view upon which to display at least a portion of the application data;
retrieving mapping data which is associated with a plurality of UI views including the selected UI view;
retrieving customizing data which is associated with only the selected UI view, wherein one of a plurality of selectable overriding preferences is selected for the selected UI view based on one or more control elements of the mapping data or customizing data, wherein the customizing data overrides one or more conflicting instructions of the mapping data for a first overriding preference, and wherein the mapping data overrides one or more conflicting instructions of the customizing data for a second overriding preference;
combining at least portions of the baseline UI view, the mapping data and the customizing data into a UI view generation data set;
retrieving an application data; and
generating the selected UI view utilizing the application data to populate the UI view generation data set;
wherein the combining includes:
combining the mapping data with the baseline UI view to create an intermediate UI view generation data set; and
combining the customizing data with the intermediate UI view data set to create the UI view generation data set; and
wherein combining the customizing data includes utilizing portions of the mapping data to determine how the customizing data is combined with the intermediate UI view generation data set to form the UI view generation data set.

* * * * *